United States Patent
Guilloux et al.

(10) Patent No.: US 8,243,856 B2
(45) Date of Patent: Aug. 14, 2012

(54) ADAPTABLE DEMODULATOR

(75) Inventors: Yveline Guilloux, Gardanne (FR); Romain Palmade, Auriol (FR); Fabrice Romain, Rians (FR); Sylvie Wuidart, Pourrieres (FR)

(73) Assignee: STMicroelectronics S.A., Montrouge (FR)

( * ) Notice: Subject to any disclaimer, the term of this patent is extended or adjusted under 35 U.S.C. 154(b) by 874 days.

(21) Appl. No.: 11/111,241

(22) Filed: Apr. 21, 2005

(65) Prior Publication Data
US 2005/0238120 A1 Oct. 27, 2005

(30) Foreign Application Priority Data
Apr. 21, 2004 (FR) .................................... 04 50746

(51) Int. Cl.
*H03D 1/00* (2006.01)
*H04L 27/06* (2006.01)

(52) U.S. Cl. ........ 375/340; 375/324; 375/343; 375/348; 375/350

(58) Field of Classification Search .................. 375/260, 375/295, 340, 316, 344, 343, 324, 142, 144, 375/148; 455/118
See application file for complete search history.

(56) References Cited

U.S. PATENT DOCUMENTS

| | | | | |
|---|---|---|---|---|
| 4,087,754 A | * | 5/1978 | Song | 375/247 |
| 4,745,625 A | * | 5/1988 | Eyuboglu | 375/316 |
| 5,052,000 A | * | 9/1991 | Wang et al. | 714/758 |
| 5,751,884 A | | 5/1998 | Ko | |
| 6,100,835 A | * | 8/2000 | Hamilton | 341/155 |
| 6,850,563 B1 | * | 2/2005 | Hulyalkar et al. | 375/233 |
| 2001/0007580 A1 | * | 7/2001 | Heinrich et al. | 375/295 |
| 2004/0152965 A1 | * | 8/2004 | Diab et al. | 600/323 |
| 2005/0025260 A1 | * | 2/2005 | Hecht et al. | 375/340 |

FOREIGN PATENT DOCUMENTS

| | | |
|---|---|---|
| GB | 2 075 693 A | 11/1981 |
| GB | 2075693 | * 11/1981 |

OTHER PUBLICATIONS

French Search Report from French Patent Application No. 04/50746, filed Apr. 21, 2004.

* cited by examiner

*Primary Examiner* — David Ometz
*Assistant Examiner* — Qutbuddin Ghulamali
(74) *Attorney, Agent, or Firm* — Wolf, Greenfield & Sacks, P.C.

(57) ABSTRACT

A method and a circuit for detecting a binary state supported by an analog symbol, comprising sampling the symbol with a sampling signal based on a frequency having a period shorter than the duration of a symbol, selecting a number of significant samples smaller than the number of samples which would be obtained with a sampling of the symbol at said frequency, and deciding of the symbol state based on the selected samples.

20 Claims, 2 Drawing Sheets

ADAPTABLE DEMODULATOR

BACKGROUND OF THE INVENTION

1. Field of the Invention

The present invention relates to the field of demodulators and more specifically to radio frequency signal demodulators, the results of which must be exploited by a digital processing unit.

2. Discussion of the Related Art

An example of application of the present invention relates to electromagnetic transponder systems in which a transponder communicates with a contactless read-write terminal.

FIG. 1 very schematically shows, in the form of blocks, the receive demodulation portion of radio frequency signals by an electromagnetic transponder.

After having been received by an antenna and setup by a coupler (not shown), radio frequency signals RF are processed by an analog demodulator 1 (ANALOG DEMOD) having the function of providing a demodulated analog signal AS as well as a sampling clock CK. The sampling clock is generally taken from the transmit carrier. Signals AS and CK are sent onto an interface circuit 2 (INTERF) having the function of providing an output signal O exploitable by a microcontroller 3 (CPU) and other digital circuits. In practice, signal O is provided to a data bus with which CPU 3 communicates. In an application to electromagnetic transponders, a transmission from a terminal to a transponder is performed by using a carrier at 13.56 Megahertz on which are transmitted coded information, generally in amplitude modulation with a non-zero modulation ratio, with a 106-kilobit-per-second flow rate. On the transponder side, the carrier is used to remotely supply circuits of the transponder in the case where the latter has no battery. The same demodulation principle is used in a terminal, except that the clock signal is generally present therein without it being necessary to extract it from the received signal.

FIG. 2 illustrates, in timing diagrams, the principle of a demodulation performed in a circuit such as illustrated in FIG. 1.

The first timing diagram illustrates an example of data D transmitted by signal RF and to be recovered at output O of circuit 2. In this example, it is assumed that the transmission of a bit at state 0 corresponds, within a bit time T, to a low level followed by a high level, while the transmission of a 1 corresponds to the inverse (high level followed by a low level). This is an example only and different types of codings and transmissions could be used. In the example of electromagnetic transponders using a 13.56-Megahertz carrier frequency, time T corresponds, for example, to 106 kilohertz.

At the output of analog demodulator 1, a signal AS (second timing diagram) which roughly follows the shape of signal D is obtained.

The recovered clock signal CK (third timing diagram) corresponds to the carrier signal, that is, to a 13.56-Megahertz frequency. For clarity, the timing diagrams of FIG. 2 are not to scale, especially in the time scale of timing diagrams AS and CK.

The last timing diagram of FIG. 2 shows signal O.

In a conventional circuit 2, signal AS is sampled only once in the middle of a cycle (times t1 and t2). In fact, signal AS is sent to the input of an inverter having its switching threshold TH conditioning the state provided at output O.

A first disadvantage of a conventional demodulation system such as illustrated in FIGS. 1 and 2 is that, if signal AS is strongly disturbed, time t1 or t2 when the signal level is taken into account risks providing an erroneous result.

Another disadvantage is that it is not possible to bring the different times of analysis of signal AS closer to one another, since this would lead to speeds incompatible with the working speed of the CPU having its clock frequency corresponding at most to the frequency of clock CK. Accordingly, the flow rate is limited.

Taking the example of electromagnetic transponder systems based on a 13.56-Megahertz frequency, the limit is in practice 106 kilobits per second to respect the time necessary for a software analysis of the received data.

It would be desirable to be able to increase the transmission speed of such systems. For example, in an application where images are desired to be transmitted (photographs, biometric prints), a flow rate of 106 kilobits per second results in transmission times of several seconds, incompatible with the desired analysis speeds.

SUMMARY OF THE INVENTION

The present invention aims at optimizing the demodulation of RF signals and in particular at increasing the possible transmission flow rates for a given clock frequency.

The present invention also aims at providing a solution which overcomes possible disturbance problems in the signal originating from an analog demodulator.

The present invention also aims at providing a solution which is compatible with conventional electromagnetic transponder architectures and especially with systems in which the clock is transmitted at the same time as the radio frequency signal.

To achieve these and other objects, the present invention provides a circuit for detecting a binary state supported by an analog symbol, comprising: an analog-to-digital conversion element using a sampling signal based on a frequency having a period shorter than the duration of a symbol; means for selecting a number of significant samples smaller than the number of samples which would be obtained with a sampling of the symbol at said frequency; and means for deciding of the symbol state based on the selected samples.

According to an embodiment of the present invention, said decision means receive an odd number of samples and provide the binary state of the symbol by applying a majority decision criterion.

According to an embodiment of the present invention, the respective positions of the significant samples are determined in a training or characterization phase.

According to an embodiment of the present invention, the sampling signal is derived from the positions selected for the significant samples.

According to an embodiment of the present invention, the sampling signal corresponds to said frequency.

According to an embodiment of the present invention, the output of the analog-to-digital conversion element is sent to the input of a shift register having its parallel outputs provided to a multiplexer for selecting said significant samples.

According to an embodiment of the present invention, registers store at least the position in a symbol of a sample considered as being significant.

According to an embodiment of the present invention, it is applied to a system of transmission between an electromagnetic transponder and a read/write terminal.

The present invention also provides a method for determining a binary state supported by an analog symbol, comprising: sampling the symbol with a sampling signal based on a frequency having a period shorter than the duration of a symbol; selecting a number of significant samples smaller than the number of samples which would be obtained with a sampling of the symbol at said frequency; and deciding of the symbol state based on the selected samples.

According to an embodiment of the present invention, an odd number of samples is selected, the symbol state being determined by majority decision based on the respective states of the different samples.

According to an embodiment of the present invention, the respective positions of the significant samples are determined by a training phase.

According to an embodiment of the present invention, the sampling signal is derived from the positions selected for the significant samples.

According to an embodiment of the present invention, the sampling signal corresponds to said frequency.

The foregoing objects, features, and advantages of the present invention, as well as others, will be discussed in detail in the following non-limiting description of specific embodiments in connection with the accompanying drawings.

DETAILED DESCRIPTION

Figure 1:
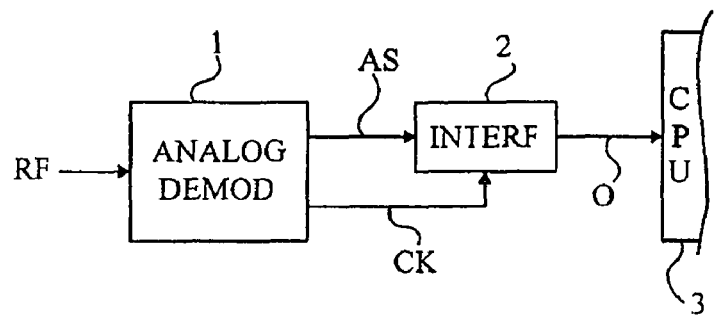
FIG. 1, previously described, shows a conventional demodulation architecture.
Figure 2:
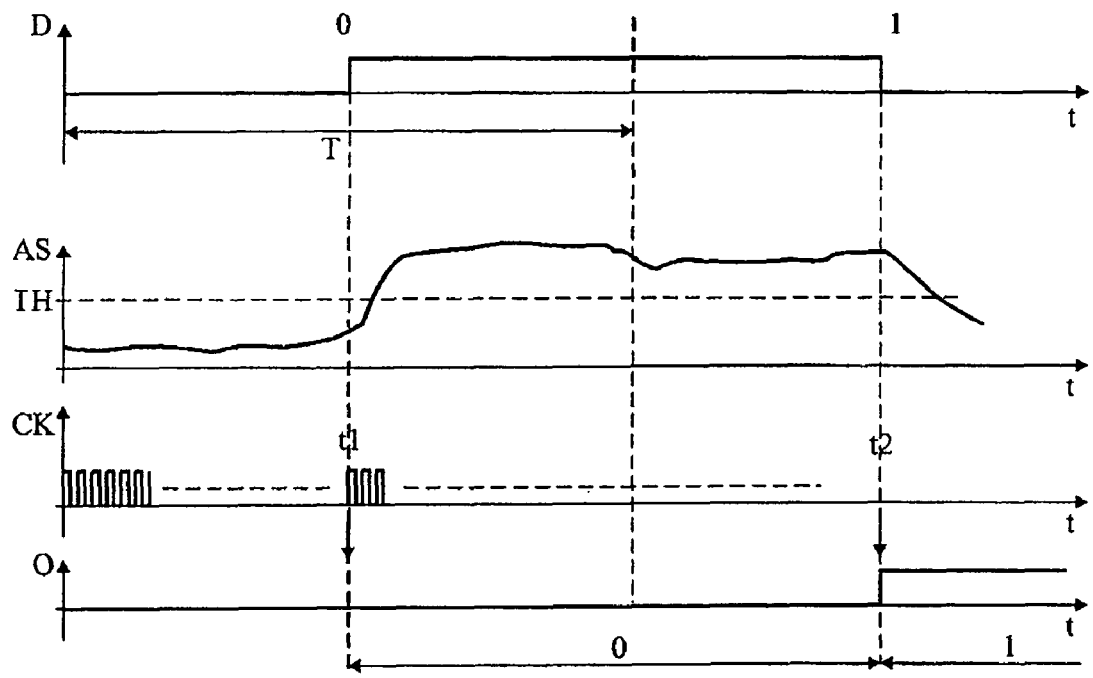
FIG. 2, previously described, illustrates the operation of the demodulator of FIG. 1.

The same elements have been designated with the same references in the different drawings. For clarity, only those elements which are necessary to the understanding of the present invention have been shown in the drawings and will be described hereafter. In particular, the circuits downstream of the demodulator have not been described in detail, the present invention being compatible with any conventional software exploitation of the signals. Similarly, the internal structure of an analog demodulator used for the present invention corresponds to a conventional structure and has not been described in detail.

A feature of the present invention is to select, in a symbol, several samples and to deduce from these samples state 0 or 1 of the symbol without using the CPU. According to the present invention, the number of samples taken into account is smaller than the number of samples which would be obtained with a sampling at the frequency on which the sampling signal is based.

Another feature of the present invention is to select a reduced number of samples per symbol as corresponding to reliable samples at positions (in time) decided in a training or characterization phase, and deducing the symbol state from these selected samples.

According to a first embodiment not shown, the analog signal originating from an analog demodulator is directly sampled at times in the symbol which correspond to the times providing the selected samples. This amounts to generating a sampling signal based on a frequency of period smaller than the duration of a symbol, but with a number of edges smaller than that of this frequency.

According to a second embodiment the sampling signal based on the sampling frequency directly is this frequency. The analog signal coming from the analog demodulator is then sampled at a frequency corresponding, preferably, to the maximum available frequency. The state 0 or 1 of the symbol is then deduced from several selected samples thereof.

Figure 3:
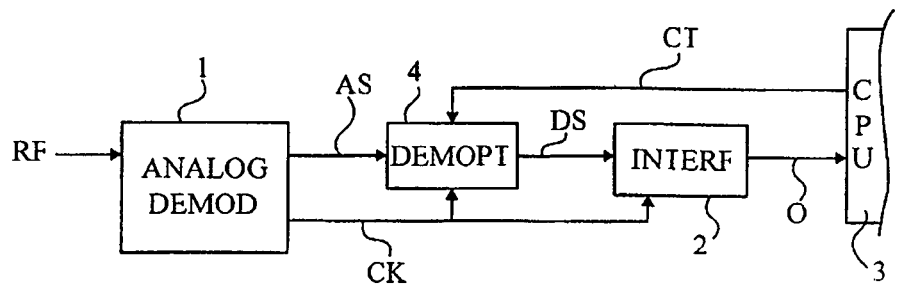
FIG. 3 very schematically shows in the form of blocks an example of the architecture of a demodulator according to the present invention.

FIG. 3 very schematically shows, in the form of blocks, this second embodiment of a demodulator according to the present invention.

As previously, a radio frequency signal RF is received by an analog demodulator 2 (ANALOG DEMOD) in charge of extracting an analog signal AS as well as a clock signal CK at the frequency of the carrier which here forms the sampling signal. Signal CK is transmitted to an interface circuit 2 which provides digital signals O to a CPU 3 as in the conventional circuit of FIG. 1.

According to this embodiment of the present invention, a demodulation optimization circuit 4 (DEMOPT) is interposed between the output of analog demodulator 1 providing signal AS and the corresponding input of interface circuit 2. Circuit 4 further receives clock signal CK as well as control signals CT from CPU 3.

Circuit 4 has the function of providing a signal DS corresponding to state 0 or 1 of the received symbol. Thus, interface circuit 2 directly receives the states exploitable by CPU 3. According to an alternative embodiment and provided that signals O are electrically compatible with the bus of connection with CPU 3, circuit 2 may be omitted.

Figure 4:
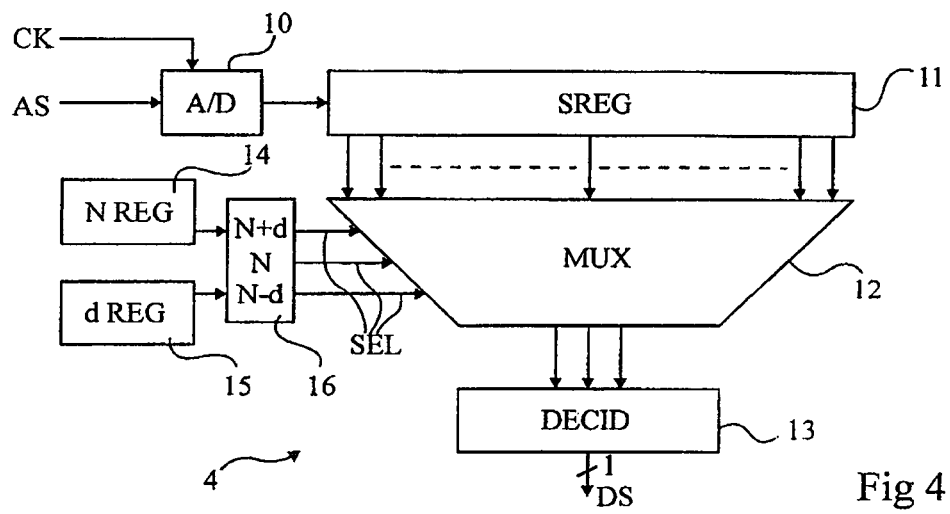
FIG. 4 shows an embodiment of a demodulation optimizer according to the present invention.

FIG. 4 shows an embodiment of a circuit 4 according to the present invention.

Signal AS crosses an analog-to-digital converter 10 (A/D) having its sampling frequency corresponding to the frequency of clock signal CK. The output of converter 10 is sent to a series input of a shift register 11 (SREG) sized so that the length of a word that it contains corresponds to the number of samples contained in a transmitted data symbol.

All the bits of register 11 are read in parallel and sent onto inputs of a multiplexer 12 having the function of selecting several samples as being significant of the symbol state.

Preferably and as illustrated in FIG. 4, multiplexer 12 selects an odd number of samples (for example, three) that it provides to a decision circuit 13 (DECID) having the function of determining the symbol state by application of a majority decision method. The output of circuit 13 provides bit DS.

According to a preferred embodiment, the selection performed by multiplexer 12 is parameterizable. For example, two registers 13 (NREG) and 14 (dREG) contain words respectively indicating position N of a central sample in a range of samples considered as reliable and distance d between two samples in the significant range. The respective values of registers 14 and 15 are then exploited by a calculation circuit 16 providing multiplexer 12 with the respective positions N of the central sample in the range and respective positions N+d and N−d of the end samples. This is an example of generation of selection signals SEL, but any other means may be used. For example, symmetrical distance d may be replaced with intervals different from one another between the sample positions.

The respective contents of registers 14 and 15 are loaded into circuit 4 by CPU 3 according to predetermined parameterizing data. In a specific example where the size of register 11 is 16 bits, registers 14 and 15 respectively contain quartets indicating the positions of the significant samples.

Figure 5:
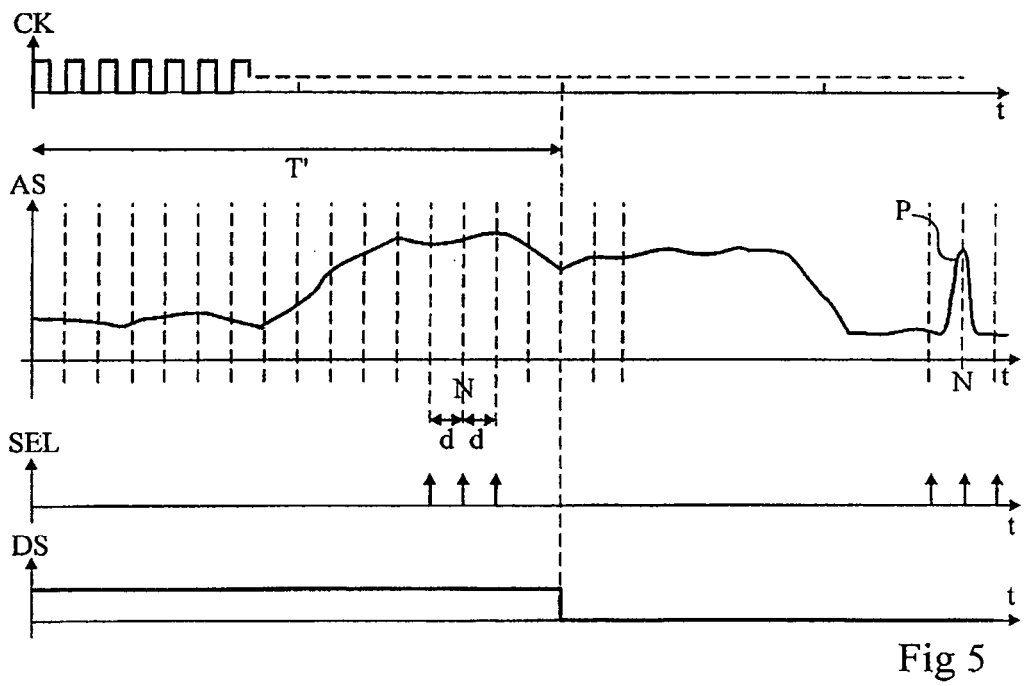
FIG. 5 illustrates, in the form of a timing diagram, the operation of a demodulation optimizer according to the present invention.

FIG. 5 illustrates, in the form of timing diagrams, the operation of an optimization circuit according to the present invention. These timing diagrams show, for transmitted states 1 and 0, respectively clock signal CK, signal AS, selection signals SEL of multiplexer 12, and output DS of circuit 13.

A signal AS having a conventionally disturbed shape is assumed. This signal is sampled at the frequency of clock CK and the multiplexer selects three samples designated by their respective position N−d and N+d. In the example of FIG. 5, in its left-hand portion, the sampling provides a state 1 on signal DS while the right-hand portion (second symbol) provides a state 0.

An advantage of the present invention is that it avoids possible detection errors due to transient disturbances on the demodulated signals. Such a disturbance is illustrated in the right-hand portion of FIG. 5 in the form of a peak p. It can be seen that, in this case, despite the fact that sample N is considered as a high state, the majority decision performed by circuit 13 enables confirming state 0 of the transmitted bit.

According to a first embodiment of the present invention, the most significant samples are determined in a phase of characterization or testing of the product or more specifically of a product batch. The present invention then takes advantage from the fact that the general shape of signal AS is most often repetitive for a same integrated circuit chip batch.

According to a second embodiment, a training phase is carried out periodically during the product lifetime to adapt the demodulator to possible drifts. These two embodiments may be combined.

The implementation of a training or characterization phase entails no specific difficulty. It is enough to know the nature of the transmitted message, to perform several different parameterizings of registers 14 and 15, and to select the first parameterizing which provides a correct result over a number (considered as significant) of symbols.

An advantage of the present invention is that it enables accelerating the transmission rate for a given clock frequency, while remaining compatible with a software interpretation of the transmitted data. Indeed, the CPU does not intervene (outside of the control phase of registers 14 and 15) in the actual sample selection. It is thus possible to increase the number of transmitted bits while respecting the possibility of interpretation by the CPU.

Thus, taking the example of electromagnetic transponders, on a 13.56-Megahertz carrier, duration T' of a symbol according to the present invention may correspond to a 847.5-kilobit-per-second flow rate. Such a factor 8 (with respect to the conventional 106-kbits/s flow rate) seems to be small but is in fact very advantageous. For example, an image which conventionally takes 4 seconds to be transmitted now only takes, due to the present invention, half a second. This speed becomes compatible with fast analysis needs, especially in authentication or access control applications.

Another advantage of the present invention is that the demodulator thus formed is parameterizable. A same hardware circuit may thus be customized to be adapted to different integrated circuits.

Of course, the present invention is likely to have various alterations, modifications, and improvements which will readily occur to those skilled in the art. In particular, other frequencies and flow rates than those indicated hereabove may be exploited.

Further, although the present invention has been more specifically described in relation with an acceleration of the flow rate, it enables, even at constant flow rate, improving the reliability of an analog demodulator.

Moreover, the practical implementation of the present invention is within the abilities of those skilled in the art, be it by hardware and/or software means, based on the functional description given hereabove.

Finally, the adaptation of the example shown in the first embodiment in which the selection is directly performed on the sampling times rather than on the actual samples, is within the abilities of those skilled in the art by using components known per se.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A circuit for detecting a binary state supported by an analog symbol, comprising:
    an analog-to-digital conversion element configured to sample a symbol having one state of two possible states using a sampling signal at a frequency having a period shorter than the duration of the symbol, to acquire a set of samples of the symbol;
    means for selecting a subset of the set of samples of the symbol, the subset including several samples of the symbol, wherein the samples in the subset are indicative of a binary symbol state; and
    means for deciding the binary symbol state based on the selected subset of the set of samples of the symbol, the selected subset of the set of samples being smaller than the set of samples of the symbol and being samples of only the symbol to be decided, wherein the binary symbol state is decided based only on the selected subset of the set of samples.

2. The circuit of claim 1, wherein said decision means receive an odd number of samples and provide the binary state of the symbol by applying a majority decision criterion.

3. The circuit of claim 1, wherein the respective positions of the selected samples are determined in a training or characterization phase.

4. The circuit of claim 3, wherein the sampling signal is derived from the positions of the selected samples.

5. The circuit of claim 1, wherein the sampling signal corresponds to said frequency.

6. The circuit of claim 5, wherein the output of the analog-to-digital conversion element is sent to the input of a shift register having its parallel outputs provided to a multiplexer for selecting said samples.

7. The circuit of claim 1, wherein registers store at least the position in a symbol of a sample considered as being indicative of the symbol state.

8. The circuit of claim 1, applied to a system of transmission between an electromagnetic transponder and a read/write terminal.

9. A method for determining a binary state supported by an analog symbol, comprising:
    sampling a symbol having one state of two possible states with a sampling signal at a frequency having a period shorter than the duration of the symbol, to acquire a set of samples of the symbol;
    selecting a subset of the set of samples of the symbol, the subset including several samples of the symbol, wherein the samples in the subset are indicative of a binary symbol state; and
    deciding the binary symbol state based on the selected subset of the set of samples of the symbol, the selected subset of the set of samples being smaller than the set of samples of the symbol and being samples of only the symbol to be decided, wherein the binary symbol state is decided based only on the selected subset of the set of samples.

10. The method of claim 9, wherein an odd number of samples is selected, the symbol state being determined by majority decision based on the respective states of the different samples.

11. The method of claim 9, wherein the respective positions of the selected samples are determined by a training phase.

12. The method of claim 11, wherein the sampling signal is derived from the positions of the selected samples.

13. The method of claim 9, wherein the sampling signal corresponds to said frequency.

14. Apparatus for determining a state of an analog symbol, comprising:
   a sampling circuit configured to sample a symbol having one state of two possible states at a frequency having a period shorter than the duration of the symbol, to acquire a set of samples of the symbol;
   a selection circuit configured to select a subset of the set of samples of the symbol, the subset including several samples of the symbol, wherein the samples in the subset are indicative of a binary symbol state; and
   a decision circuit configured to determine the binary symbol state based on the selected subset of the set of samples of the symbol, the selected subset of the set of samples being smaller than the set of samples of the symbol and being samples of only the symbol to be determined, wherein the binary symbol state is determined based only on the selected subset of the set of samples.

15. Apparatus as defined in claim 14, wherein the decision circuit receives an odd number of samples and provides the state of symbol by applying a majority decision criteria.

16. Apparatus as defined in claim 14, wherein the sampling circuit comprises an analog-to-digital conversion element and wherein the selection circuit comprises a shift register and a multiplexer, the shift register receiving an output of the analog-to-digital conversion element and providing parallel outputs to the multiplexer for selecting said samples.

17. Apparatus as defined in claim 16, wherein the selection circuit further includes a register to store a position in a symbol of a sample to be selected.

18. A method for determining a state of an analog symbol, comprising:
   sampling a symbol having one state of two possible states at a frequency having a period shorter than the duration of the symbol, to acquire a set of samples of the symbol;
   selecting a subset of the set of samples of the symbol, the subset including several samples of the symbol, wherein the samples in the subset are indicative of a binary symbol state; and
   deciding the binary symbol state based on the selected subset of the set of samples of the symbol, the selected subset of the set of samples being smaller than the set of samples of the symbol and being samples of only the symbol to be decided, wherein the binary symbol state is decided based only on the selected subset of the set of samples.

19. The method of claim 18, wherein an odd number of samples of the symbol is selected, the state of the symbol being determined by majority decision based on the selected samples.

20. The method of claim 18, further comprising determining positions of the selected samples during a characterization phase.

* * * * *